United States Patent [19]

Schmid et al.

[11] Patent Number: 5,505,991
[45] Date of Patent: Apr. 9, 1996

[54] PRODUCTION OF SILICON OXIDE-COATED SOLID PARTICLES

[75] Inventors: Raimund Schmid, Neustadt; Norbert Mronga, Dossenheim; Juan A. G. Gomez; Reinhold Rieger, both of Ludwigshafen; Reinhold Schlegel, Hassloch, all of Germany

[73] Assignee: BASF Aktiengesellschaft, Ludwigshafen, Germany

[21] Appl. No.: 348,244

[22] Filed: Nov. 28, 1994

[30] Foreign Application Priority Data

Oct. 21, 1994 [DE] Germany .................. 44 37 752.2

[51] Int. Cl.[6] ................................................ B05D 7/00
[52] U.S. Cl. .................. 427/215; 427/212; 427/213; 427/219; 427/248.1
[58] Field of Search ..................... 427/212, 215, 427/219, 213, 248.1

[56] References Cited

U.S. PATENT DOCUMENTS 5,352,487  10/1994  Klinedinst et al. ........... 427/248.1
5,364,467  11/1994  Schmid et al. ................ 106/404

FOREIGN PATENT DOCUMENTS 0033457   8/1981   European Pat. Off. .
0045851   2/1982   European Pat. Off. .
0338428  10/1989   European Pat. Off. .
0571836  12/1993   European Pat. Off. .
4223384   1/1994   Germany .

*Primary Examiner*—Shrive Beck
*Assistant Examiner*—David M. Maiorana
*Attorney, Agent, or Firm*—Oblon, Spivak, McClelland, Maier & Neustadt

[57] ABSTRACT

Silicon oxide-coated solid particles are produced by decomposing silanes which contain at least one alkanoyloxy radical with water vapor and/or oxygen in the presence of the agitated solid particles.

10 Claims, No Drawings

PRODUCTION OF SILICON OXIDE-COATED SOLID PARTICLES

The present invention relates to a novel process for producing silicon oxide-coated solid particles by decomposing volatile silicon compounds with water vapor and/or oxygen in the presence of the agitated solid particles.

Silicon oxide coatings are of interest for many sectors of industry. Especially in the colorant sector, plateletlike pigments wherein the substrate particles have been coated with metal oxide and/or metal layers are becoming increasingly important. These luster effect pigments are suitable for many applications, for example for automotive coatings and other decorative coatings, for plastics pigmentation, for paints, printing inks, especially security printing inks, and for cosmetics.

Their optical effect is based on the directed reflection of light at predominantly sheetlike, mutually parallel-oriented, metallic or strongly refractive pigment particles (metallic effect pigments or pearl luster pigments). Depending on the composition of the pigment platelets, ie. including the nature of the coating on the substrate particles, interference, reflection and absorption phenomena create angle-dependent color and lightness effects.

Of the oxidic coating materials, silicon oxide (in particular silicon dioxide) is of particular importance since silicon oxide layers in combination with metallic layers create especially in the case of metal pigments (metallic substrate particles) very strong, attractive interference colors.

Such pigments are described in earlier German Patent Application P 44 05 492.0. Special emphasis is given to aluminum platelets comprising a silicon oxide layer from 50 to 600 nm in thickness, a metal layer from 1 to 25 nm in thickness and optionally an additional silicon oxide layer from 5 to 250 nm in thickness.

In the production process of P 44 05 492.0, the silicon oxide layers are applied to the metallic substrate particles wet-chemically by hydrolysis of organic silicon compounds, especially the alkoxides such as tetraethoxysilane, in the presence of an organic solvent such as isopropanol.

EP-A-571 836 mentions the possibility of coating metal platelets with silicon oxide by gas phase decomposition/chemical vapor deposition (CVD) of silicon tetrachloride with water vapor. However, this method is problematical especially in relation to the production of relatively thick silicon oxide layers, since the substrate particles tend to agglomerate in the presence of silicon tetrachloride and are therefore impossible to coat uniformly with silicon oxide.

Earlier German Patent Application P 44 14 079.7 describes a further CVD process wherein aluminum pigments are coated with silicon oxide by decomposition of silicon compounds which contain nitrogen but no alkanoyloxy radicals, especially by decomposition of 3-aminopropyltriethoxysilane.

It is an object of the present invention to provide an economical process for also producing relatively thick silicon oxide coatings.

We have found that this object is achieved by a process for producing silicon oxide-coated solid particles by decomposing volatile silicon compounds with water vapor and optionally oxygen in the presence of the agitated solid particles, which comprises using silicon compounds comprising silanes containing at least one alkanoyloxy radical.

Suitable silanes conform in particular to the formula I $$R_a SiX_b Y_c \qquad \text{I}$$

where

R is alkyl, preferably $C_1$–$C_{10}$-alkyl, particularly preferably $C_1$–$C_6$-alkyl, which can be substituted by chlorine, which can be monounsaturated or polyunsaturated and whose carbon chain may be interrupted by one or more imino groups or oxygen atoms in ether function; phenyl, which can be $C_1$–$C_2$-alkyl-substituted, or hydrogen;

R is alkoxy, preferably $C_1$–$C_6$-alkoxy;

Y is alkanoyloxy, preferably $C_2$–$C_3$-alkanoyloxy;

a is from 0 to 3, preferably from 0 to 2, particularly preferably 0;

b is from 0 to 3, preferably from 1 to 3, particularly preferably 2;

c is from 1 to 4, preferably from 1 to 3, particularly preferably 2, the sum a+b+c=4 and the radicals R for a>1, the radicals X for b>1 and the radicals Y for c>1 can each be identical or different.

Suitable radicals R include in particular for example methyl, ethyl, propyl, isopropyl, butyl, isobutyl, sec-butyl, tert-butyl, pentyl, isopentyl, sec-pentyl, tert-pentyl, hexyl, 2-methylpentyl, heptyl, octyl, 2-ethylhexyl, nonyl, decyl and branched radicals of this kind and also vinyl, phenyl, methylphenyl and dimethylphenyl. Preference is given to methyl, ethyl, propyl and isopropyl.

Suitable alkoxy radicals X can likewise be branched and unbranched. Suitable examples are methoxy, ethoxy, propoxy, isopropoxy, butoxy, isobutoxy, sec-butoxy, tert-butoxy, pentoxy, isopentoxy, sec-pentoxy, tert-pentoxy, hexoxy and 2-methylpentoxy. Preference is given to butoxy radicals, especially tert-butoxy.

Suitable alkanoyloxy radicals Y include for example acetoxy, propionyloxy and isopropionyloxy. Acetoxy is preferred.

Of particular suitability are those silanes which at temperatures ≦600° C., for technical reasons especially ≦300° C., have a sufficiently high vapor pressure to ensure simple vaporization and are also easy to decompose with water vapor and/or air and depositable as oxide. Of course, it is also possible to use mixtures of different silanes.

Preferred silanes contain four organic substituents, particular preference being given to silanes in which the silicon atom carries only oxygen-bonded organic radicals, ie. alkanoyloxy groups (especially acetoxy groups) and in particular additionally also alkoxy groups.

Specific examples of suitable silanes include the following: tetraacetoxysilane, methoxy-, ethoxy-, propoxy-, isopropoxy-, butoxy-, isobutoxy-, sec-butoxy- and tert-butoxytriacetoxysilane, dimethoxy-, diethoxy-, dipropoxy-, diisopropoxy-, dibutoxy-, diisobutoxy-, di-sec-butoxy- and di-tert-butoxydiacetoxysilane and trimethoxy-, triethoxy-, tripropoxy-, triisopropoxy-, tributoxy-, triisobutoxy-, tri-sec-butoxy- and tri-tert-butoxy-acetoxysilane and also silanes which contain different alkoxy radicals, e.g. methoxydiacetoxysilane.

Preference is given for example to diisopropoxydiacetoxysilane and diisobutoxydiacetoxysilane. very particular preference is given to di-tert-butoxydiacetoxysilane.

In the process of the present invention, the silicon oxide coating is applied to the agitated substrate particles, generally at from 100° to 600° C., preferably at from 150° to 300° C., by preferably decomposing the silanes (carried into the reactor in vapor form by means of a carrier gas such as nitrogen) with water vapor and optionally air or other oxygen/inert gas mixtures. The silanes can also be decomposed using oxygen (or air) only; in this case higher temperatures are advisable.

Depending on the thickness of the silicon oxide layer to be applied, various reactors can be used.

Relatively thin silicon oxide layers (≦about 50 nm) can be deposited in a mechanically rotatable single-neck round-bottom quartz glass flask which has gas inlet and outlet lines in the axis of rotation and is heated by a clamshell oven.

In principle, it is possible to use as reactor any heatable mixer which, by means of appropriate internal fitments, provides gentle agitation of the substrate particles and permits a gas inflow and outflow.

For a continuous process on an industrial scale it is also possible to use for example a rotary tube oven, into which the substrate particles, the silane-carrier gas mixture and the water vapor are fed on a continuous basis.

To produce particularly high-grade, thicker silicon oxide layers (≧50 nm), it is advisable to use a fluidized bed reactor as described for example in EP-A 45 851. The substrate particles are heated in the reactor to the desired reaction temperature under fluidization with an inert gas such as nitrogen, and silane and water vapor (and optionally oxygen) are then introduced with the aid of inert carrier gas streams (advantageously part of the fluidizing gas) from upstream vaporizer vessels via separate nozzles.

To obtain homogeneous silicon oxide layers which will completely envelop the substrate particles in the form of a film, the silane concentration is advantageously held at ≦5% by volume, preferably ≦2% by volume, based on the total amount of gas in the reactor.

The amount of water vapor required for the decomposition depends on the concentration of the silane and should correspond at least to the amount stoichiometrically required for hydrolysis, but preference is given to an amount from 10 to 100 times that amount.

If the silane contains alkyl or phenyl substituents R, it is advisable to have oxygen present in the course of the decomposition if the deposited silicon oxide layer is not to contain carbon residues which generally form when water vapor is used alone.

Here too the oxygen should be used in at least the amount stoichiometrically necessary for forming carbon monoxide, carbon dioxide and water, but it is preferable to use from 10 to 100 times that amount.

The waste gases which form in the course of the decomposition— the preferred, commercially available di-tert-butoxydiacetoxysilane gives rise to tert-butanol and acetic acid—are easy to remove from the waste air in a waste gas scrubber.

The CVD process of the present invention has the considerable advantage that immediately following the coating with silicon oxide, after replacement of the reaction gases and, if necessary, after adjustment of the temperature, it is possible to apply further, metal and/or metal oxide layers to the substrate particles. The substrate material need not be intermediately isolated or even dried.

On completion of the coating operation the reactor is cooled down and the coated product is discharged.

The process of the present invention provides an advantageous way of coating with silicon oxide any particles which are stable under the coating conditions.

The process is of particular importance for the coating of inorganic and organic pigments, which is of interest especially for plateletlike pigments, since on further coating, for example with metal layers, they result in attractive luster pigments.

Examples of preferred substrate materials are plateletlike copper phthalocyanine, silicatic platelets and especially metal platelets which may have already been provided with metal oxide and/or metal coatings.

Suitable metallic substrates include in particular all metals and alloys in platelet form known for metallic effect pigments. Examples besides steel, copper and its alloys such as brass and bronzes include in particular aluminum and its alloys such as aluminum bronze.

Preference is given to aluminum flakes which are producible in a simple manner by stamping out of aluminum foil or by widely used atomization and grinding techniques.

Suitable aluminum pigments are produced for example by the Hall process by wet grinding in white spirit. The starting material is an atomized, irregular aluminum grit which is ball-milled in white spirit and in the presence of a lubricant into plateletlike particles which are subsequently classified.

Commercial products can be used. However, the surface of the aluminum particles should be substantially free of fats or other coating media. These substances can to some extent be removed by solvent treatment or better, as described in DE-A-42 23 384, by oxidative treatment.

Suitable already coated metal substrates include for example iron oxide-coated aluminum pigments (EP-A-33 457) and titanium dioxide-coated aluminum pigments (EP-A-338 428), which have a golden to red self-color or show delicate pastel shades, and also magnetizable aluminum pigments with an iron, cobalt, nickel or γ-$Fe_2O_3$ coating (earlier German Patent Applications P 43 13 541.2 and 43 40 141.4).

Suitable silicatic substrates include in particular light-colored or white micas, particularly preferably flakes of preferably wet-ground muscovite. It is of course also possible to use other natural micas such as phlogopite and biotite, artificial micas and talc and glass flakes.

The silicate platelets may likewise already be coated with (highly refractive) metal oxides such as titanium, zirconium, zinc, tin, chromium or iron oxide and/or bismuth oxychloride.

Preference is given to mica pigments comprising an oxide coating which consists essentially of titanium dioxide and contains at most a minor amount of the other oxides mentioned.

Metal oxide-coated silicatic pigments are generally known and also commercially available as Iriodin® (Merck, Darmstadt), Flonac® (Kemira-Oy, Pori) or Mearlin® (Mearl Corporation, New York).

The process of the present invention makes it possible to apply high-quality homogeneous, filmlike and interference-capable silicon oxide layers in any desired thickness (for example from 10 to 800 nm) in a simple and economical manner to any desired substrate materials. The process thus also offers an advantageous way of producing the particularly color-strong metallic effect pigments described in earlier German Patent Application P 44 05 492.0, which comprise an inner silicon oxide layer and an outer metal layer (iron, chromium, tungsten or preferably molybdenum) and also, if desired, further metal oxide layers.

EXAMPLES

The exemplified coatings of aluminum pigments were each carried out in an externally heatable fluidized bed reactor made of glass, having a diameter of 16 cm and a height of 100 cm, and equipped with a glass frit bottom and filter socks, suspended from the top and cleaned with a nitrogen jet, and two gas injection nozzles situated on the side above the frit bottom.

A) Coating with silicon oxide xg of aluminum powder (Al 1: average particle diameter 60 μm, BET surface area 1.5 $m^2/g$; Al 2: average particle diameter 20 μm, BET surface area 4.5 m²/g) were heated to 200° C. under fluidization with a total of 1420 l/h of nitrogen. Some of the nitrogen (400 l/h) was passed into the reactor through a water vaporizer reservoir temperature controlled to 50° C. 140 l of air were metered into the fluidizing gas over 1 h to degrease the aluminum powder.

Then a further 400 l h of the fluidizing gas were passed through a reservoir of di-tert-butoxydiacetoxysilane heated to 160° C. (in the case of Al 1) or 120° C. (in the case of Al 2). In this way 25 (or else 20) ml portions of the silane were transferred into the reactor over $t_1$ h to a total of y ml.

The coating with silicon oxide left the appearance of the aluminum powder virtually unchanged. Scanning electron micrographs always showed a virtually quantitative (no additional $SiO_2$ particles), filmlike $SiO_2$ deposition. The $SiO_2$ contents of the pigment sample are shown in the table.

B) Coating with molybdenum

The $SiO_2$-coated aluminum powder was then heated to 220° C. under fluidization with a total of 1800 l/ h of nitrogen. 400 l/ h of the nitrogen were passed over a molybdenum hexacarbonyl reservoir temperature controlled to 70° C. (the silane and water reservoirs having been removed beforehand). In this way z g of $Mo(CO)_6$ were decomposed in the reactor over $t_2$ h into molybdenum and carbon monoxide.

On completion of the molybdenum deposition, the fluidizing gas was admixed with a little air during the cooling-down period to passivate the molybdenum surface.

Further details concerning these experiments and their results are summarized in the following table:

TABLE

| Ex. | x g | Al | y ml of silane | $t_1$ h | z g of $Mo(CO)_6$ | $t_2$ h | % by weight of $SiO_2$ | % by weight of Mo | Appearance of pigment |
| --- | --- | --- | --- | --- | --- | --- | --- | --- | --- |
| 1 | 500 | Al 1 | 400 | 5 | 55.8 | ~8 | 14.1 | 3.5 | virtually unchanged strong metallic luster; strong blue interference color |
| 2 | 500 | Al 1 | 720 | 9 | 60.0 | ~8,5 | 24.3 | 4.0 | strong metallic luster; strong blue interference color with a flop toward violet at steeper viewing angles |
| 3 | 200 | Al 2 | 795 | 40 | 65.0 | ~9 | 44.5 | 6.0 | metallic luster; reddish golden interference color with flop toward greenish golden at steeper viewing angles |

We claim:

1. A process for producing silicon oxide-coated solid particles by decomposing volatile silicon compounds with water vapor and/or oxygen in the presence of agitated solid particles, which comprises using silicon compounds comprising silanes containing at least one alkanoyloxy radical.

2. A process as claimed in claim 1, wherein the silanes used contain at least one alkanoyloxy radical and at least one alkoxy radical.

3. A process as claimed in claim 1, wherein the silanes used contain at least one $C_2$–$C_3$-alkanoyloxy radical and at least one $C_1$–$C_6$-alkoxy radical.

4. A process as claimed in claim 1, wherein the silanes used contain two identical or different alkanoyloxy radicals and two identical or different alkoxy radicals.

5. A process as claimed in claim 1, wherein di-tert-butoxydiacetoxysilane is used.

6. A process as claimed in claim 1, wherein the silanes used additionally contain one or two identical or different alkyl radicals which contain up to 10 carbon atoms and may be substituted by chlorine and whose carbon chain may be interrupted by one or more imino groups or oxygen atoms and which may be monounsaturated or polyunsaturated, or phenyl radicals which may be substituted by $C_1$–$C_2$-alkyl.

7. A process as claimed in claim 1 wherein the process is carried out in a fluidized bed reactor.

8. A process as claimed in claim 1 wherein the solid particles are inorganic and organic pigments.

9. A process as claimed in claim 1 wherein the solid particles are selected from the group consisting of one or more metal platelets, silicatic platelets and copper phthalocyanine platelets optionally coated with other metal oxides and/or metals.

10. A process as claimed in claim 1, further comprising, after the application of the silicon oxide layer, additionally coating the solid particles with metal.

* * * * *